C. M. Clark.
Broadcast Seeder.
N°36,073. Patented Aug. 6, 1862.
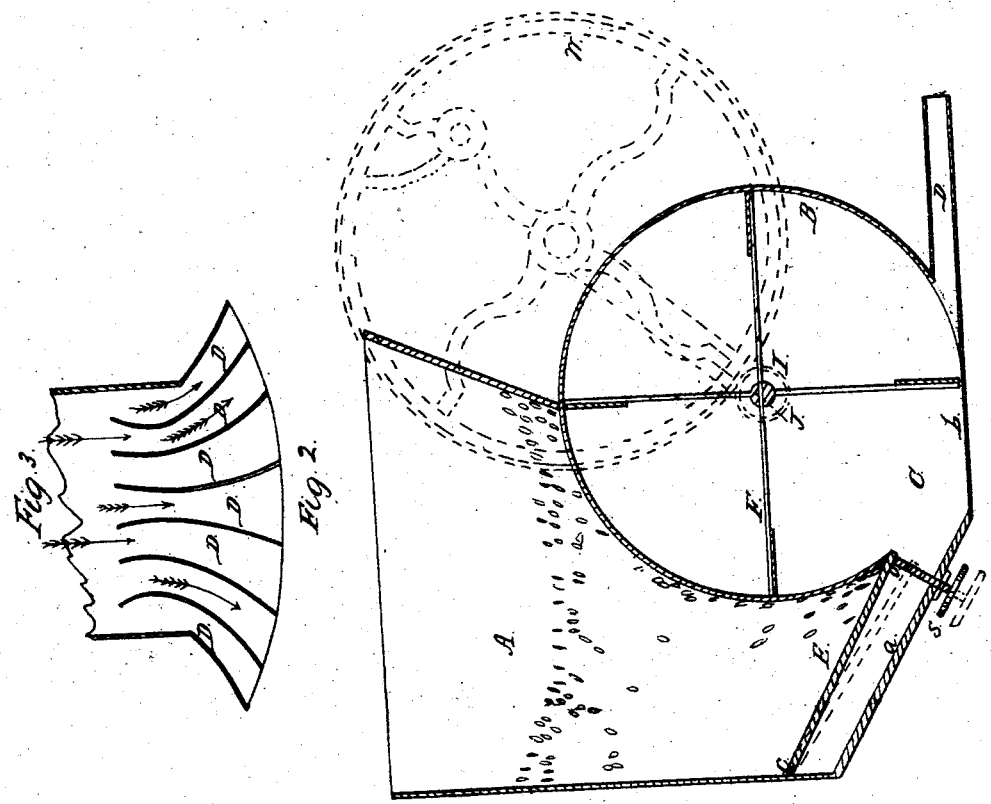
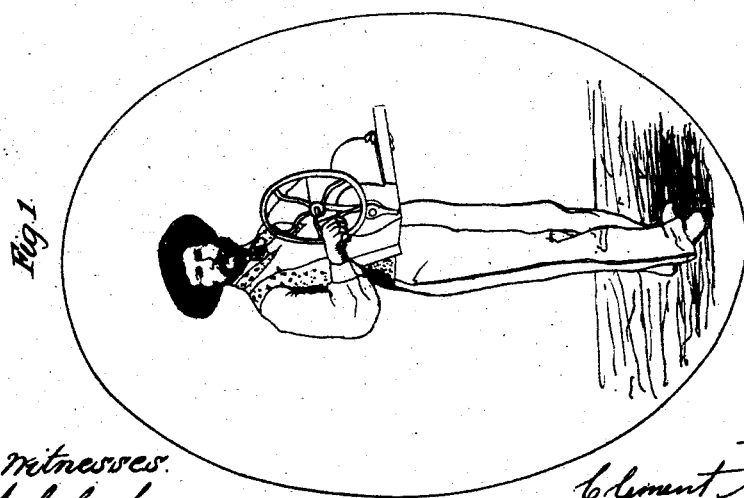
Witnesses.
Inventor
Clement M. Clark

UNITED STATES PATENT OFFICE.

CLEMENT M. CLARK, OF CINCINNATI, OHIO.

IMPROVEMENT IN BROADCAST-SOWERS.

Specification forming part of Letters Patent No. 36,073, dated August 5, 1862.

*To all whom it may concern:*

Be it known that I, CLEMENT M. CLARK, of the city of Cincinnati, in the county of Hamilton and State of Ohio, have invented a new and useful Improvement in Broadcast-Sowers; and I hereby declare that the following is a full, clear, and exact description of the same, reference being had to the accompanying drawings and letters of reference marked thereon, which form part of this specification.

My invention has reference to the method of distributing or scattering the seed; and it consists of a hopper or receptable from which the seed is blown by a revolving fan through a series of diverging ducts, the whole being constructed in such a manner and of such a size as to be conveniently carried and operated by a man or boy.

In order that others duly skilled may be enabled to understand and construct and use my improved sower, I shall proceed to describe the same in detail.

In the accompanying drawings, Figure 1 is a photograph showing a man carrying and operating the implement. Fig. 2 is a vertical section of the implement cut by a plane at right angles to axis of fan-blower. Fig. 3 is a horizontal section through the diverging seed-ducts.

Like letters of reference designate like parts in all the drawings.

A is the hopper or seed-reservoir. It may be constructed of wood, tinned iron plate, or of other suitable material, and of a shape convenient for being carried in front of the body by the operator. The bottom *a* of said hopper is made slanting downward and forward and joins the floor *b* of seed-ducts, Fig. 2. In front, and at the lower part of hopper, a cylindrical case of sheet metal, B, is fixed, part of said case forming the lower portion of front wall of hopper A, and a segment of said cylindrical case being cut away at C to permit communication between the hopper A and seed-ducts D.

E is a false bottom or valve to hopper, hinged at *c* to the back wall of hopper.

S is a set-screw, with milled head, passing through bottom *a*, and being attached at its extremity to the free end of valve E, the object of screw S and valve E being to regulate the opening O at bottom of hopper, and thus control the delivery of seed therefrom into ducts D.

Within the cylindrical case B a fan, F, is made to revolve by means of the driving-wheel W, which wheel is journaled on a prolongation of the bar W′, on which the fan-blower F is journaled, and is provided with a hand-winch, H. The periphery of the driving-wheel W is made to come in close contact with periphery of a small pulley, I, on end of axle J of fan, a band of vulcanized caoutchouc or other elastic material being stretched around said pulley I in order to make the contact more complete. On the rotation of the driving-wheel W by the operator the fan is rapidly set in motion by the friction between the two surfaces or peripheries by the rapid rotation of the fan F. The seed admitted from the hopper A are blown through the diverging ducts D.

The ducts, of which there may be any number, are shown in plan on Fig. 3 as being curved outward something in the manner of a fan. The seed, in being propelled through these ducts by the blast from fan, take the direction of the ducts, and thus diverge more and more widely in proportion to the distance they reach before falling to the ground.

By means of the hinged valve E and screw S the rate of delivery of seed to the fan may be regulated with the greatest nicety, and when it is so required the communication between the hopper and the fan-case may be entirely closed, as shown in black lines, Fig. 2.

The operation of my invention, after what has been said, may be explained in a few words. The implement, being suspended by a strap passing around the neck of the operator, is carried in front, as represented in Fig. 1, and, the hopper or canvas bag being filled with seed, valve E is set to the required opening and the rotation of wheel W commenced, the fan F being rapidly rotated. The current of air which is generated forces the seed out through the seed-ducts D in continuous diverging streams, thus distributing the seed regularly and evenly, and requiring but little labor and attention on the part of the operator.

It should here be particularly observed that the arrangement and operation of this machine is such that the seed is impelled outward, not only by the current of air, but that the blades of the fan also encounter a portion of the grains and impart an additional force to them, so that a considerably greater breadth of ground is reached by the seed than would be reached if the seed were impelled by the air only. In this particular respect, as well as in many others which it is not necessary to enumerate, my invention differs from the invention of Mr. Peter Lawrenson, patented April 8, 1856.

It should be mentioned that this apparatus may be employed with advantage in projecting sand upon the freshly-painted surface of walls. The force with which the sand is projected causes it to penetrate thoroughly and leave a heavy uniform coating of sand well incorporated with the paint.

Should it be desired to connect this machine with a vehicle to be drawn by a team, thus making a power-sower, it may be considerably enlarged, and the fan may be operated by a band or gearing connecting it with a revolving pulley or wheel attached to some of the running parts of the vehicle in any convenient manner, such as are in common use for accomplishing similar purposes.

Simplicity and cheapness of construction, together with great efficiency in practical working, are among the advantages afforded by my invention.

Having described my invention, I do not claim the use of the fan-blast separately for the purpose herein described.

I claim—

Projecting the seed from the cylindrical case B, in which the fan revolves, by means of the fan-blast, in combination with the impact of the blades of the fan, substantially as described.

CLEMENT M. CLARK.

Witnesses:
WM. R. McCOMAS,
D. L. REID.